Patented Feb. 14, 1933

1,897,260

UNITED STATES PATENT OFFICE

ROY H. KIENLE AND HARRY C. ROHLFS, OF SCHENECTADY, NEW YORK, ASSIGNORS TO GENERAL ELECTRIC COMPANY, A CORPORATION OF NEW YORK

FLEXIBLE ALKYD RESIN AND METHOD OF PREPARATION

No Drawing. Application filed September 16, 1929, Serial No. 393,119. Renewed January 11, 1933.

The present invention deals with the class of synthetic resins known as "alkyd resins." Alkyd resins include all those complexes resulting primarily from the interreaction of a polyhydric alcohol and a polybasic acid, with or without other reacting ingredients. The most common example of an alkyd resin is the resin produced by the reaction of glycerine and phthalic anhydride.

It has been known that dibasic aliphatic acids impart flexibility to alkyd resins when substituted for part of the polybasic acid commonly used, that is, phthalic anhydride. However, resinous bodies thus prepared on extended curing lose their flexibility; furthermore, such bodies possess relatively low degrees of esterification and hence high acidity, and these unesterified ingredients are often undesirable in the product.

It has further been known that when a portion of the glycerine used is replaced by glycols, alkyd resins containing a materially lower percentage of unesterified ingredients than is ordinarily present result, but the flexibility of the resins is not materially enhanced by such replacement.

It has also been known that resinous bodies may be made by causing a dihydric alcohol such as glycol to react with organic acids in place of glycerine, but the resulting product is one which cannot be converted to the non-fusible state and hence no great technical utilization has been made of such a resin. Dihydric alcohol-dibasic acid esters, such as glycol succinate, are in fact wax-like, semi-granular, permanently fusible bodies. The permanency of these bodies, their heat resistance and the apparent tendency of the reacting ingredients to link up in such a manner as to give chain-like molecular aggregates, are qualities which have been discovered by us to make such bodies excellent agents for imparting flexibility to resinous bodies, lacquers and the like.

We have discovered that dihydric alcohol-dibasic aliphatic acid esters are excellent agents for imparting flexibility to alkyd resins, and that their use obviates the difficulties encountered when dibasic aliphatic acids alone are used to replace part of the polybasic acid used, or when dihydric alcohols alone are used to replace a portion of the glycerine commonly used, and we have further discovered that the use of such esters, which by themselves are practically technically useless, with alkyd resins produces an excellent flexible resinous product.

In carrying out our invention we prefer to prepare the ester in situ while preparing the alkyd resin.

As illustrative of the effectiveness of the use of such esters with alkyd resins, the following table is given for resins prepared from various mol proportions of glycol-succinate and glycerol-phthalate, the glycol succinate being prepared in situ during the production of the alkyd resin.

*Effect of glycol succinate on flexibilization*

1 mol glycol succinate = glycol 62 grams, succinic acid 118 grams 1 mol glycerol phthalate = glycerol 184 grams, phthalic anhydride 444 grams

*Mol proportions*

| Glycol-succinate | Glycer-ol-phthalate | Temp. of preparation | Cure time at 150° C. | Remarks |
|---|---|---|---|---|
| | | | Weeks | |
| 0 | 1 | 180–200° C. | 5 | Very tough, stiff, hard. |
| 1 | 1 | 180–200° C. | 3 | Tough, hard, quite flexible. |
| 1½ | 1 | 180–200° C. | 3 | Tough, hard, can be easily bent. |
| 2 | 1 | 180–200° C. | 3 | Tough, permanently flexible. |
| 4 | 1 | 180–200° C. | 3 | Tough, exceedingly flexible under all conditions. |
| 1 | 0 | 180–200° C. | 1 | Waxy mass. |

The above resinous products were each prepared by heating all the ingredients in an aluminum vessel to the required temperature until there was evidence of the beginning of gelation, as indicated by coagulation near the top. The melt was then poured into shallow amalgamated tins and cured at about 150° C. or higher, from about three to about five weeks.

Tests on all of these resins after curing show permanency of flexibilization to temperature, test pieces submitted to 200° C. for three to four days showing no change.

Resins so prepared also show high water resistance as evidenced by the fact that the resins which were submerged in cold water for a week and boiling water for a half hour showed no whiteness.

We have been able to shape certain compositions, for example, the resin prepared by using the proportion 1.5 mols of glycol-succinate to one mol of glycerol-phthalate, using celluloid technique, into various articles such as brush handles, combs and the like.

The resinous products prepared by the process of our invention may be dissolved in suitable solvents such as acetone, monoethyl ether of glycol, ethyl lactate, dibutyl phthalate, etc., and the resulting solution used as a lacquer which produces flexible films. The resinous product may be employed as the resin ingredients in cellulose ester lacquers imparting adhesion, flexibility and durability to the resulting film.

Our invention is not limited to the use of glycol and succinic acid or the ester produced from these substances, with alkyd resins; it embraces also other dihydric alcohols and other dibasic aliphatic acids. For example, as dihydric alcohols we may employ propylene glycol, diethylene glycol, tetramethylene glycol, and the like; and as dibasic aliphatic acids we may employ such acids as adipic acid, sebacic acid, maleic acid, malic acid, and the like. It is of course, understood that other polybasic acids besides phthalic acid or its anhydride and polyhydric alcohols other than glycerine, especially those having three or more hydroxyl groups in the molecule, may be used in preparing an alkyd resin.

What we claim as new and desire to secure by Letters Patent of the United States, is:

1. The method of producing a flexible resinous body which comprises preparing an alkyd resin in the presence of glycol succinate.

2. The method of imparting flexibility to an alkyd resin which comprises reacting said resin ingredients in the presence of a dihydric alcohol-dibasic aliphatic acid ester.

3. The method of preparing a flexible alkyd resin which comprises the steps of heating desired proportions of glycerine, phthalic anhydride, glycol and succinic acid until incipient gelation and then curing the melt at about 150° C. or higher from about three to about five weeks.

4. The method of producing a flexible resinous body which comprises the steps of reacting a mixture of a resin-forming polybasic organic aromatic acid, an alcohol having at least three hydroxyl groups, a dihydric alcohol and a dibasic aliphatic acid.

5. The method of producing a permanently flexible resinous body which comprises the steps of reacting a mixture of a resin-forming polybasic organic aromatic acid, an alcohol having at least three hydroxyl groups, a dihydric alcohol and a dibasic aliphatic acid and curing the reacted mass.

6. The method which comprises decreasing the proportion of polybasic organic aromatic acid-polyhydric alcohol ester with respect to dibasic aliphatic acid-dihydric alcohol ester in a reaction mixture including polybasic organic aromatic acid, polyhydric alcohol having at least three hydroxyl groups in the molecule, dibasic aliphatic acid and dihydric alcohol, in order to increase the flexibility of the resulting product.

7. A flexible alkyd resin comprising the reaction product of a mixture of glycerine, phthalic anhydride, a dihydric alcohol and a dibasic aliphatic acid.

8. A flexible alkyd resin comprising the reaction product of a polybasic organic aromatic acid, an alcohol having at least three hydroxyl groups, a dihydric alcohol and a dibasic aliphatic acid.

9. An alkyd resin comprising the product of condensation of glycerine, phthalic anhydride, and glycol succinate.

10. A cured permanently flexible resin comprising the mixed esters produced by the reaction of a mixture of glycerine, phthalic anhydride, glycol and succinic acid.

11. A cured resin comprising the cured reaction product of an alkyd resin prepared in the presence of a dihydric alcohol and a dibasic aliphatic acid.

12. A flexible alkyd resin comprising the reaction product of phthalic anhydride, glycerine, glycol and adipic acid.

13. A flexible alkyd resin comprising the reaction product of a polybasic organic aromatic acid, an alcohol having at least three hydroxyl groups, a dihydric alcohol and adipic acid.

In witness whereof, we have hereunto set our hands this 14th day of September, 1929.

ROY H. KIENLE.
HARRY C. ROHLFS.